United States Patent [19]

Perzl et al.

[11] Patent Number: 5,033,059
[45] Date of Patent: Jul. 16, 1991

[54] GAS LASER APPARATUS

[75] Inventors: Peter R. Perzl, Fürstenfeldbruck; Wolfgang Rüberg, Aschheim; Heinz B. Puell, Munich, all of Fed. Rep. of Germany

[73] Assignee: Heraeus Holding GmbH, Hanau am Main, Fed. Rep. of Germany

[21] Appl. No.: 519,131

[22] Filed: May 4, 1990

[30] Foreign Application Priority Data

May 6, 1989 [DE] Fed. Rep. of Germany ....... 3914919

[51] Int. Cl.⁵ .............................................. H01S 3/097
[52] U.S. Cl. .......................................... 372/86; 372/38
[58] Field of Search .................. 372/58, 59, 86, 87, 372/92, 38

[56] References Cited

U.S. PATENT DOCUMENTS

| 4,555,787 | 11/1985 | Cohn et al. | 372/86 |
| 4,606,035 | 8/1986 | Hishii et al. | 372/86 |
| 4,611,327 | 9/1986 | Clark et al. | 372/58 |
| 4,718,072 | 1/1988 | Marchetti et al. | 372/86 |

FOREIGN PATENT DOCUMENTS 0051581  3/1983  Japan ........................................ 372/9

Primary Examiner—Léon Scott, Jr.
Attorney, Agent, or Firm—Felfe & Lynch

[57] ABSTRACT

A discharge device for a gas laser has an AC-supplied pre-ionizing electrode enveloped in dielectric material, which has a length corresponding approximately to that of the cathode and anode and lies ahead of the cathode and anode in the direction of the flow of the gas, and which is connected to one of the main electrodes through a low impedance with regard to the pre-ionizing alternating current. To obtain a high ionization power with a low alternating current power requirement, while at the same time pre-ionizing the entire volume of the incoming gas present between cathode and anode, the pre-ionizing electrode is connected both to the anode and to the cathode through a low impedance with regard to the pre-ionizing alternating current.

5 Claims, 1 Drawing Sheet

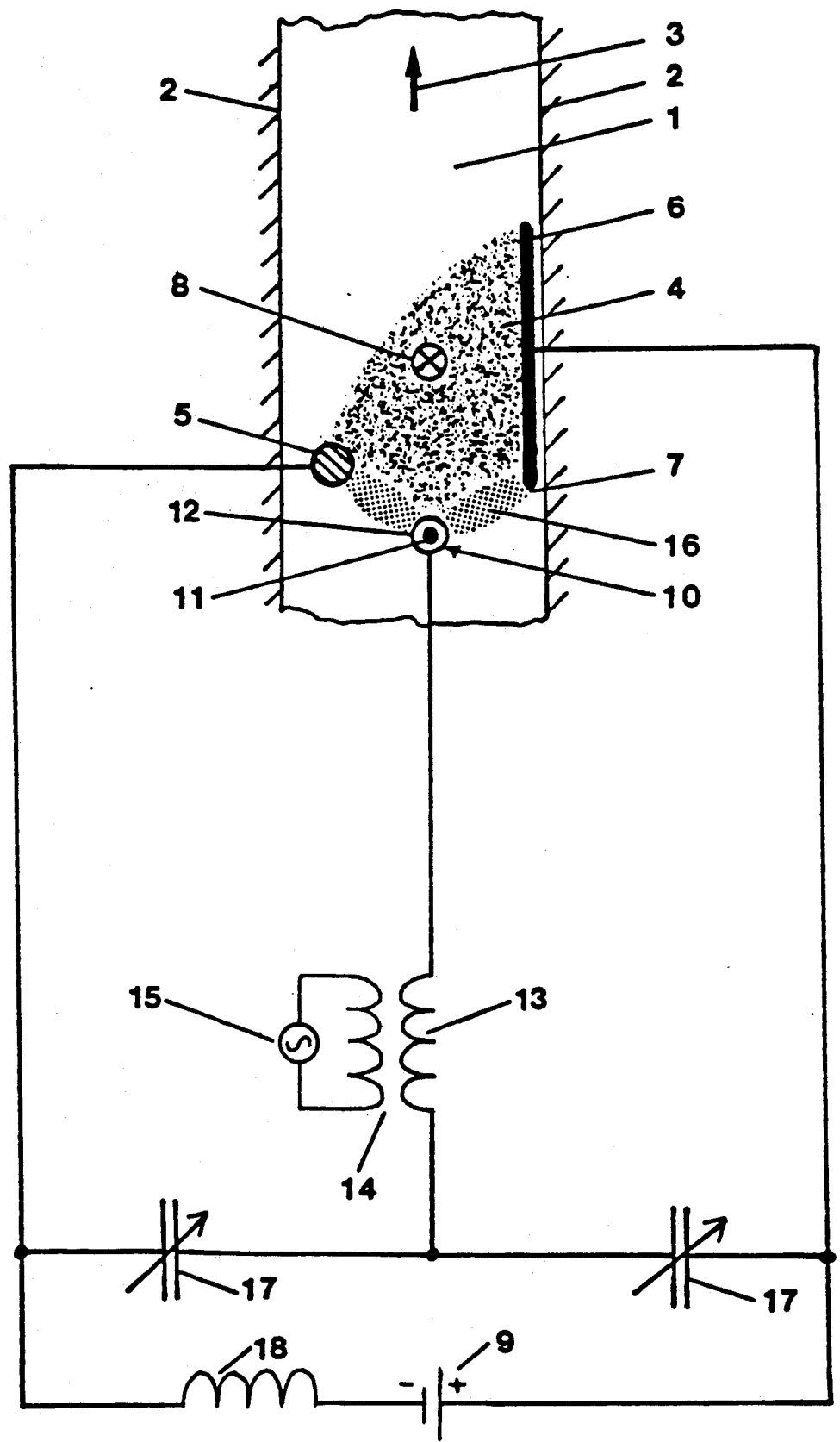

GAS LASER APPARATUS

BACKGROUND OF THE INVENTION

The invention relates to a discharge device, especially for a gas laser, having a discharge chamber through which a gas flows at a high velocity. The gas discharge is a steady-field discharge between an anode and a cathode opposite the anode as the main electrodes, which extend on either side of the flow of the gas. The device has a pre-ionizing electrode which is covered with dielectric material and fed with an alternating current, and has a length corresponding approximately to that of the cathode and anode. This pre-ionizing electrode is situated ahead of the cathode and/or the anode in the direction of flow of the gas, and it is connected to one of the main electrodes through a low impedance in regard to the pre-ionizing alternating current.

U.S. Pat. No. 4,488,309 discloses a discharge device of this kind, in the form of a gas laser. This gas laser has an anode extending in the direction of flow, which defines one side of the gas discharge channel for the gas; opposite this anode are a number of pin-like single cathodes disposed athwart the gas flow, each connected by high-ohmic impedances to the direct-current source. About in the middle between the anode and the single cathodes there is disposed a rod-like pre-ionizing electrode which has a conductive core enveloped in a dielectric coating. The pre-ionizing electrode is connected to an alternating current source. Also, between the anode and the ground potential there is a capacitance, and between the output of the power source and the anode an inductance, which serve as energy accumulators for pulsing. The capacitance and inductance must be designed for a high pulse energy so as to keep the continuous output of the direct-current power supply low. With this arrangement a stable DC glow discharge is produced, which can easily be switched and pulsed, i.e., has a good starting performance; also, the voltage of the DC discharge is lowered. In this circuit the pre-ionizing discharge burns exclusively between the pre-ionizing electrode and the anode, since high input impedances are in the cathode circuit. This has the result that the gas volume in the discharge chamber is pre-ionized but irregularly, and the power requirement for the purpose is relatively high. The cost of the power supply is high, since the production of a high-frequency alternating current power source is disproportionately expensive in comparison to the DC power supply.

German Federal Patent 28 56 328, to which U.S. Pat. No. 4,449,220 corresponds (incorporated herein by reference), discloses another discharge device for a gaseous medium, in which the auxiliary discharge is a steady-field pre-ionization produced by a plurality of pin-like pre-ionizing electrodes projecting from the wall of the discharge chamber. Power on the order of 40% of the total input power is required for the auxiliary discharge. This is given additional importance by the fact that the individual secondary electrodes are provided with high input impedances for the stabilization of the additional discharge, and these cause a considerable power loss. Additional complication develops if the discharge is to be switched rapidly, since either two independent power supplies must be used or the main discharge part and the auxiliary discharge part have to be definitely separated from on another.

WO 82/01281 discloses one embodiment of pre-ionizing arrangements of this kind. In particular it describes the shape of single added electrodes for DC pre-ionization, and T-shaped hooks, U-shaped hooks and L-shaped hooks extending into the discharge chamber are given as possible forms. This pre-ionizing arrangement requires a great amount of power.

SUMMARY OF THE INVENTION

It is the object of the present invention to construct a gas laser of the kind described above, in such a manner that a high ionization power will be obtained at a low alternating current power requirement, while the entire volume of the instreaming gas present between the cathode and anode will be pre-ionized.

This object is accomplished by connecting the pre-ionizing electrode both to the anode and to the cathode through a low impedance with regard to the pre-ionizing alternating current. The arrangement of a pre-ionizing electrode between cathode and anode through a low impedance connected to both has the advantage that the AC circuit can be connected both to the anodes and to the cathodes. The auxiliary discharge burning between the pre-ionizing electrode and the main electrodes fills the entire space, seen transversely to the direction of flow of the gas, between the cathode and the anode, so that in the area ahead of the main electrodes a uniform pre-ionizing of the entire input volume of gas is obtained. The main discharge thus finds in front of it a discharge path that is completely pre-ionized between the two main electrodes, so that, on the one hand, the main discharge can be operated at extremely low currents, and on the other hand switching and pulsing is possible without problems; the amount of energy required is thus kept very low.

Arranging the pre-ionizing electrode to be equidistant from the anode and from the cathode has the advantage that the eddies in the wake of the pre-ionizing electrode remain sufficiently far away from the main electrodes. Thus instability in the discharge at the main electrodes, especially at the cathode, is avoided.

The capacitances are advantageously variable condensers, so that individual adjustments can be made. Connecting at least one of the main electrodes and a capacitance associated with the pre-ionizing electrode to the DC source entails the advantage that any parasitic AC current flow that might possibly come through the DC power supply will be suppressed.

Actually, the effects of capacitive coupling of AC and DC systems via electrodes and leads, and the inductance of electric conductors, electrodes, and above all of the DC power supply itself, are very important. This means that the entire system should be so adjusted by the insertion of the described inductances and capacitances that the AC discharge or the combined AC-DC auxiliary discharge will fill the area between the dielectric pre-ionizing electrode and the two main electrodes with approximately equal intensity.

BRIEF DESCRIPTION OF THE DRAWING

The sole FIGURE shows a gas discharge chamber with a pre-ionizing device.

DETAILED DESCRIPTION OF THE PREFERRED EMBODIMENT

FIG. 1 shows a detail of a gas discharge channel 1 of a laser with side walls which define the gas discharge channel in the main discharge area 4 transversely of the gas flow which is indicated by the arrow 3. The main discharge takes place between a cathode 5 and an anode 6 extending in the direction of gas flow, the cathode 5 and the leading edge 7 of the anode 6 being situated at about the same height transversely of the direction of flow of the gas. The optical axis of the resonator is indicated by the arrow 8. Cathode 5 and anode 6 are connected to a DC power supply 9. The main electrodes 5 and 6 in the form of the cathode and the anode extend transversely of the gas stream, i.e., perpendicularly to the plane of drawing. A pre-ionizing electrode 10 is disposed ahead of the cathode and anode 6 in the direction of flow of the gas, being at the same distance from the anode 6 as from the cathode 5. The pre-ionizing electrode 10 consists of an electrically conductive core 11 which is surrounded by an envelope 12 of dielectric material; this dielectric material is fused vitreous silica.

The pre-ionizing electrode 10 is connected to one end of the secondary winding 13 of an output transformer 14 of the alternating current supply 15. This transformer 14 changes a low voltage on the primary side to a high voltage on the secondary side as a power supply for the pre-ionizing electrode 10. Between this pre-ionizing electrode 10 and the main electrodes 5 and 6 an auxiliary discharge 16 burns uniformly over the entire width of the gas discharge channel 1 transversely of the direction of flow 3. In the area of the auxiliary discharge 16 the gas is thus completely and uniformly pre-ionized at the input end of the main electrodes 5 and 6. With a very low energy demand, an immediate ignition of the main discharge 4 between the main electrodes 5 and 6 is obtained. A stable main discharge 4 can be sustained at the main electrodes 5 and 6 even at very low current intensities.

The DC power supply of the main electrodes 5 and 6 and the AC power supply of the pre-ionizing electrode 10 are coupled to one another via variable condensers 17. Also, one of the condensers 17 and the cathode 5 or anode 6 are connected by an inductance 18 to the DC power supply 9 of the main electrodes 5 and 6, thereby largely suppressing any AC flow through the DC power supply. The variable condensers 17 offer the possibility of optimizing the pre-ionizing arrangement to allow for the geometrical conditions in the discharge chamber of the laser during its operation such that the pre-ionization before the anode 6 and cathode 5 will burn with equal intensity. Short individual discharge gaps between the pre-ionizing electrode 10 and the main electrodes 5 and 6 are obtained, for which very low discharge voltages suffice.

We claim:

1. Apparatus for the input of electrical energy into an active gas in a laser, said apparatus comprising
   a gas discharge chamber through which said gas flows at high velocity, said chamber comprising an input end and an exit end defining a direction of flow of said gas,
   an anode and an elongate cathode lying opposite each other in said discharge chamber and having like lengths extending transversely of the direction of flow,
   a DC power supply connected to said anode and said cathode for applying a voltage therebetween to maintain a steady glow discharge of said active gas flowing therebetween,
   an elongate pre-ionizing electrode lying parallel to said elongate cathode and ahead of at least one of said cathode and said anode in the direction of flow in said discharge chamber, said pre-ionizing electrode comprising an envelope of dielectric material and having a like length as said anode and said cathode,
   an AC power supply connected to said pre-ionizing electrode,
   means connecting said pre-ionizing electrode both to said anode and said cathode so that pre-ionizing glow discharges are produced with approximately equal intensity between said pre-ionizing electrode and the respective anode and cathode.

2. Apparatus as in claim 1 wherein said pre-ionizing electrode is at like distances from both said anode and said cathode.

3. Apparatus as in claim 1 wherein said means connecting said pre-ionizing electrode both to said anode and said cathode comprises a voltage transformer connected between the pre-ionizing electrode and both the anode and the cathode, and a pair of capacitances connected between the transformer and the respective anode and cathode.

4. Apparatus as in claim 3 wherein said capacitances are adjustable capacitances.

5. Apparatus as in claim 3 further comprising an inductance which is connected between said DC power supply and at least one of said anode and said cathode, said inductance also being connected between said DC power supply and one of said capacitances.

* * * * *